United States Patent [19]
Hong et al.

[11] Patent Number: 6,153,257
[45] Date of Patent: Nov. 28, 2000

[54] PROCESS FOR PREPARING A CATHODE CONTAINING ALKALINE EARTH METAL OXIDES FOR MOLTEN CARBONATE FUEL CELLS

[75] Inventors: Seong Ahn Hong; Tae Hoon Lim; In Hwan Oh; Suk Woo Nam; Hyung Joon Choi, all of Seoul, Rep. of Korea

[73] Assignee: Korea Institute of Science and Technology, Seoul, Rep. of Korea

[21] Appl. No.: 08/919,323

[22] Filed: Aug. 28, 1997

[30] Foreign Application Priority Data

Aug. 31, 1996 [KR] Rep. of Korea ...................... 96-37662

[51] Int. Cl.$^7$ .................................................. H01M 4/88
[52] U.S. Cl. ........................... 427/115; 29/623.5; 429/16; 429/45
[58] Field of Search ........................... 429/44, 27, 231.6, 429/223, 218.1, 40, 16, 45, 41; 427/115; 29/623.5

[56] References Cited

U.S. PATENT DOCUMENTS

| | | | |
|---|---|---|---|
| 4,436,794 | 3/1984 | Takeuchi et al. | 429/40 |
| 4,555,457 | 11/1985 | Dhanji | 429/199 |
| 4,663,250 | 5/1987 | Ong et al. | 429/16 |
| 4,780,437 | 10/1988 | Smith | 502/101 |
| 4,894,297 | 1/1990 | Singh et al. | 429/31 |
| 4,895,774 | 1/1990 | Ohzu et al. | 429/35 |
| 4,992,341 | 2/1991 | Smith et al. | 429/40 |
| 4,992,342 | 2/1991 | Singh et al. | 429/44 |
| 5,110,541 | 5/1992 | Yamamasu et al. | 419/2 |
| 5,312,580 | 5/1994 | Erickson et al. | 419/2 |
| 5,312,582 | 5/1994 | Donado | 429/19 |
| 5,453,101 | 9/1995 | Ong et al. | 29/623.5 |
| 5,456,991 | 10/1995 | Ong et al. | 429/44 |
| 5,641,328 | 6/1997 | Ong et al. | 29/623.5 |

FOREIGN PATENT DOCUMENTS

| | | |
|---|---|---|
| 3-105867 | 5/1991 | Japan . |
| 9-259894 | 10/1997 | Japan . |

OTHER PUBLICATIONS

Choi, H.J., et al. "An evaluation of a stabilized NiO cathode for the reduction of NiO dissolution in molten carbonate fuel cells," J. Power Sources vol. 61 issue 1–2, pp.239–245, Jul. 1996.

J. R. Selman, et al., Plenum Press. New York, pp. 394–398, "Fuel Cell Systems", 1993 (Month N/A).

K. Ota, et al., Proceedings of the Second Symposium on Molten Carbonate Fuel Cell Technology, pp. 318–337, "Solubilities of Metal Oxides in Molten Carbonate", 1990 (Month N/A).

A. Pigeaud, et al., Fuel Cell Seminar Program and Abstracts, pp. 193–197, "Optimization of Molten Carbonate Fuel Cell Electrolyte", 1988 (Month N/A).

K. Tanimoto, et al., Journal of Power Sources, vol. 39, pp. 285–297, "Cell Performance of Molten–Carbonate Fuel Cell with Alkali and Alkaline–Earth Carbonate Mixtures", 1992 (Month N/A).

(List continued on next page.)

Primary Examiner—Maria Nuzzolillo
Assistant Examiner—Jonathan Crepeau
Attorney, Agent, or Firm—Oblon, Spivak, McClelland, Maier & Neustadt, P.C.

[57] ABSTRACT

The present invention relates to a cathode, which can be used in molten carbonate fuel cells (hereinafter, referred to as an "MCFC"), and a process for preparing the same. In such a cathode, NiO, which is inexpensive and has relatively good electrochemical performance, has been mainly used. However, NiO has a relatively large solubility in electrolytes of an MCFC which causes the cells to be short circuited, thereby shortening the life of the cells. However, according to the present invention, a cathode having a longer life than common cathodes for MCFC can be prepared by adding alkaline earth metal oxides, which are basic substances, to NiO, the main material of the cathodes, or impregnating an Ni plate with a solution of the alkaline earth metal oxides, to reduce the solubility of the NiO while maintaining its performance as the cathode.

2 Claims, 5 Drawing Sheets

OTHER PUBLICATIONS

D.A. Shores, et al., Proceedings of the First Annual Fuel Cells Contractors Review Meeting, pp. 161–182, "Cathode Dissolution", 1989 (Month N/A).

H. Ohzu, et al., 1988 Fuel Cell Seminar Program and Abstracts, pp. 291–295, "Effect of Alkali Earth Carbonate Addition in Electrolyte on NiO Cathode Dissolution", 1988 (Month N/A).

L. Smith, et al., 1988 Fuel Cell Seminar Program and Abstracts, pp. 188–192, "Argonne MCFC Cathode Development", 1988 (Month N/A).

L. Plomp, et al., Journal Of Power Sources, vol. 39, pp. 369–373, "Improvement of Molten–Carbonate Fuel Cell (MCFC) Lifetime", 1992 (Month N/A).

H. R. Kunz, et al., Proceedings of the Second Symposium on Molten Fuel Cell Technology, pp. 157–168, "Ionic Migration in Molten Carbonate Fuel Cells", 1990 (Month N/A).

Fig. 1

Flow Chart of Process I.

Fig. 2

Flow Chart of Process II.

Fig. 3

Single Cell Performances of a NiO Cathode and MgO+NiO Cathode.

Anode: $H_2/CO_2/H_2O=72/18/10$
Cathode: $Air/CO_2=70/30$
$U_f=0.4$ at $150 mA/cm^2$

Fig. 4

Distribution of Ni Deposit in the Cross Section of Matrix After 500hrs of Operation.

Distance From Cathode/Matrix Interface

Comparison of the Ni Deposition between (a) NiO Cathode and (b) NiO+MgO Cathode.

FIG.5A

Distance From Cathode/Matrix Interface

Comparison of the Ni Deposition between (a) NiO Cathode and (b) NiO+MgO Cathode.

FIG.5B

PROCESS FOR PREPARING A CATHODE CONTAINING ALKALINE EARTH METAL OXIDES FOR MOLTEN CARBONATE FUEL CELLS

BACKGROUND OF THE INVENTION

The present invention relates to a cathode, which can be used in molten carbonate fuel cells (hereinafter, frequently referred to as an "MCFC"), and a process for preparing the same. More specifically, the present invention relates to a process for preparing a cathode having a longer life than common cathodes for MCFC by adding alkaline earth metal oxides, for example MgO, SrO, etc., to NiO, which is a main component of cathodes, to reduce the solubility of NiO in the electrolytes of MCFC while maintaining its performance as the common cathode.

Nickel oxide (NiO), which is currently used as a material of common cathodes for MCFC, has been widely used because it is inexpensive and has relatively good electrochemical performance. However, the solubility of NiO in $Li_2CO_3/K_2CO_3$ molten carbonate, an electrolyte of MCFC, is relatively high. Thus, using NiO presents the problem that, as the operating time of a cell increases, NiO is dissolved in the electrolyte thereof and then is precipitated as Ni metal which can cause a short circuit within the cell. The life of the cell is thereby shortened. Accordingly, to achieve continuous operation over 40,000 hours which is a development goal in an MCFC commercial system, the dissolution problem of cathodes must be solved. With this goal in mind, research has been steadily conducted to solve the dissolution problem of cathodes in the electrolytes of the cells.

First, the method of suppressing cathode dissolution by adjusting the operating conditions of cells has been suggested. The solubility of NiO in electrolytes is dependent on the partial pressure of $CO_2$ in the gas of cathodes, the operating temperature of cells, the concentration of $H_2O$ and so on. Therefore, when the operating conditions of cells are adjusted so that the dissolution of the cathodes thereof is reduced, the performance of the cells is also slightly reduced. However, the life of the cells may be extended due to the reduction of cathode dissolution. In other words, cathode dissolution may be suppressed by lowering the partial pressure of $CO_2$ in gas of the cathodes and increasing the thickness of matrixes to increase the time before a short circuit of the cell occurs [see, L. J. M. J. Blomen and M. N. Mugerwa, "Fuel Cell System", 397, Plenum Press, New York (1993)].

Second, the method of suppressing cathode dissolution by adjusting the composition of carbonates which are used as electrolytes in MCFC was suggested. Since NiO is dissolved in the electrolytes at the common operating conditions of MCFC in accordance with the acidic dissolution mechanism, the method of increasing the basicity of the electrolytes was suggested as a means for lowering the solubility of NiO. Either increasing the content of $Li_2CO_3$ or using $Na_2CO_3$ instead of $K_2CO_3$ was suggested to increase the basicity of $62Li_2CO_3\text{-}38K_2CO_3$ eutectic salt electrolyte which has been the most widely used electrolyte in the research conducted by several entities including Ota et al. [K. Ota, S. Mitsushima, K. Kato and N. Kamiya, Proceedings of the Second Symposium on Molten Carbonate Fuel Cell Technology, Ed. by J. R. Selman, The Electrochemical Soc., Pennington, N.J., 318–337 (1990)], the ERC (Energy Research Corporation) of the U.S.A. [P. Pigeaud, C-Y, Yuh and H. Maru, 1988 Fuel Cell Seminar Program and Abstracts, Long Beach, Calif., 193–197 (1988)], the GIRIO (Government Industrial Research Institute, Osaka) of Japan [K. Tanimoto, Y. Miyazaki, M. Yanagida, S. Tanabe, K. Kojima, N. Ohtori, H. Okuyama and T. Kodama, J. of Power Sources, 39, 285–297 (1992)] and so on. The research reports of the foregoing organizations show that the experiments changing the composition of the electrolyte from $62Li_2CO_3\text{-}38K_2CO_3$ to $72Li_2CO_3\text{-}28K_2CO_3$ or $52Li_2CO_3\text{-}48NaCO_3$ molten salt reduced the solubility of NiO in the electrolyte.

As an another method to increase the basicity of the electrolyte, the addition of a new third basic substance to the electrolyte while maintaining the common composition of the electrolyte was suggested. For example, the fact that the solubility of NiO was reduced compared to conventional cases when the carbonate of an alkaline earth metal ($MgCO_3$, $CaCO_3$, $SrCO_3$, $BaCO_3$) was added to $62Li_2CO_3\text{-}38\ K_2CO_3$ electrolyte was shown by the research results of the ERC of the U.S.A. and the GIRIO of Japan [see the cited literature above], the IGT (Institute of Gas Technology) of the U.S.A. [P. A. Shores, J. R. Selman and E. T. Ong, 1989 Proceedings of the First Annual Fuel Cells Contractors Review Meeting, Ed. by W. J. Huber, Morgantown, W. Va., 161–182 (1989)] and the Toshiba Company of Japan [H. Ohzu, T. Ogawa, Y. Akasaka, M. Yamamoto and K. Murata, 1988 Fuel Cell Seminar Program and Abstracts, Long Beach, Calif., 291–295 (1988)].

Third, the improvement of NiO and the development of substitute substances thereof were suggested. For example, the ANL (Argonne National Laboratory) of the U.S.A. suggests $LiFeO_2$, $LiMnO_2$, etc. [L. Smith, G. H. Kucera and A. P. Brown, 1988 Fuel Cell Seminar Program and Abstracts, Long Beach, Calif., 188–192 (1989)], the ECN (Netherlands Energy Research Foundation) of the Netherlands suggests $LiCoO_2$ and perovskite substance [L. Plomp, J. N. J. Veldhuis, E. F. Silters and S. B. van der Molun, J. of Power Sources, 39, 369–373 (1992)], and Ota et al. suggest nickel ferrite [see the cited literature above].

As described above, various methods for solving the dissolution problem of NiO have been suggested. However there are still many problems associated with the practical utilization of the suggested methods. For example, in the method of adjusting the operating conditions of cells, the performance of the cells is reduced and the lengthening of the life of the cells is limited.

In the method of adjusting the basicity of electrolytes, which reduces slightly the solubility of NiO, there is a limit to how much cell life can be increased by only changing the common composition of the electrolytes to increase the basicity of the electrolytes, and a problem that changing the composition of the electrolytes affects the performance of MCFC. Further, experimental results have shown that the method of adding the carbonate of an alkaline earth metal, for example $SrCO_3$, as a third substance to common electrolytes does not particularly help to lengthen the life of MCFC [H. R. Kunz and L. J. Begoli, Proceedings of the Second Symposium on Molten Carbonate Fuel Cell Technology, Ed. by J. R. Selman, The Electrochemical Soc., Pennington, N.J., 157–168 (1990)]. This method is not an effective solution to the dissolution problem because the ions in molten salts move in opposite directions in accordance with their respective charges according to the potential difference between the anode and cathode which arises when operating MCFC. Thus, high basicity near the cathode is not maintained due to the distribution phenomena of the ions originating from the mobility difference of each ion. In other words, the cations, i.e., $K^+$, $Li^+$, $Sr^{2+}$, etc., in molten salts move in the direction of the cathode, but the concentration of $Sr^{2+}$ ion in the vicinity of the cathode remains very low due to the different relative mobility of the cations and thus, the addition of $SrCO_3$ loses its effect.

In the method of developing substitute substances of NiO, cathodes using substitute substances provide the desired property that the solubility thereof for electrolytes is below 1/10 of those of common cathodes. However, various problems still must be solved before practical use is possible, such as the deterioration of cell performance due to the reduction of electrical conductivity, the difficulty in preparing large-scale cell due to the deterioration of the mechanical strength of cathodes, the deterioration of cell performance during operation when pressure is applied and so on.

BRIEF SUMMARY OF THE INVENTION

The present inventors have conducted extensive and intensive studies to solve the conventional problems described above to prepare a cathode having a longer life than common cathodes for MCFC. As a result, the present invention is based on the inventors' discovery that the dissolution of NiO, which is a cathode material, can be reduced while maintaining cathode performance by adding to NiO alkaline earth metal oxides, which are basic substances, to stabilize NiO.

Therefore, it is an object of the present invention to provide a cathode made of NiO, which is relatively inexpensive and has good electrochemical properties, for molten carbonate fuel cells which has a longer life than common cathodes for MCFC solving the dissolution problem of NiO for electrolytes.

It is an another object of the present invention to provide a process for preparing such a cathode.

The said objects and other objects, features and advantages of the present invention will be more distinctly understood by referring to the following detailed description of the present invention.

BRIEF DESCRIPTION OF THE SEVERAL VIEWS OF THE DRAWING

Hereinafter, the present invention will be described in greater detail from the following detailed description taken in connection with the accompanying drawings in which.

DETAILED DESCRIPTION OF THE INVENTION

The above objects of the present invention can be accomplished by adding an alkaline earth metal oxide which is a basic substance, for example, MgO, CaO, SrO, BaO, etc., to NiO, which is a main component of cathodes, to reduce the solubility of NiO in electrolytes.

The process for preparing a cathode for MCFC according to the present invention is characterized by directly adding alkaline earth metal oxide powder to Ni powder and sufficiently mixing the resulting mixture by ball milling, and then molding the mixture as a thin plate by tape casting (hereinafter, frequently referred to as "Process I"), or dipping the Ni thin plate molded by tape casting into an aqueous alkaline earth metal nitrate solution, and then converting an alkaline earth metal nitrate into an alkaline earth metal oxide through calcination of the impregnated thin plate (hereinafter, frequently referred to as "Process II").

Process I (First Mixing-Second Molding Process)

Figure 1:
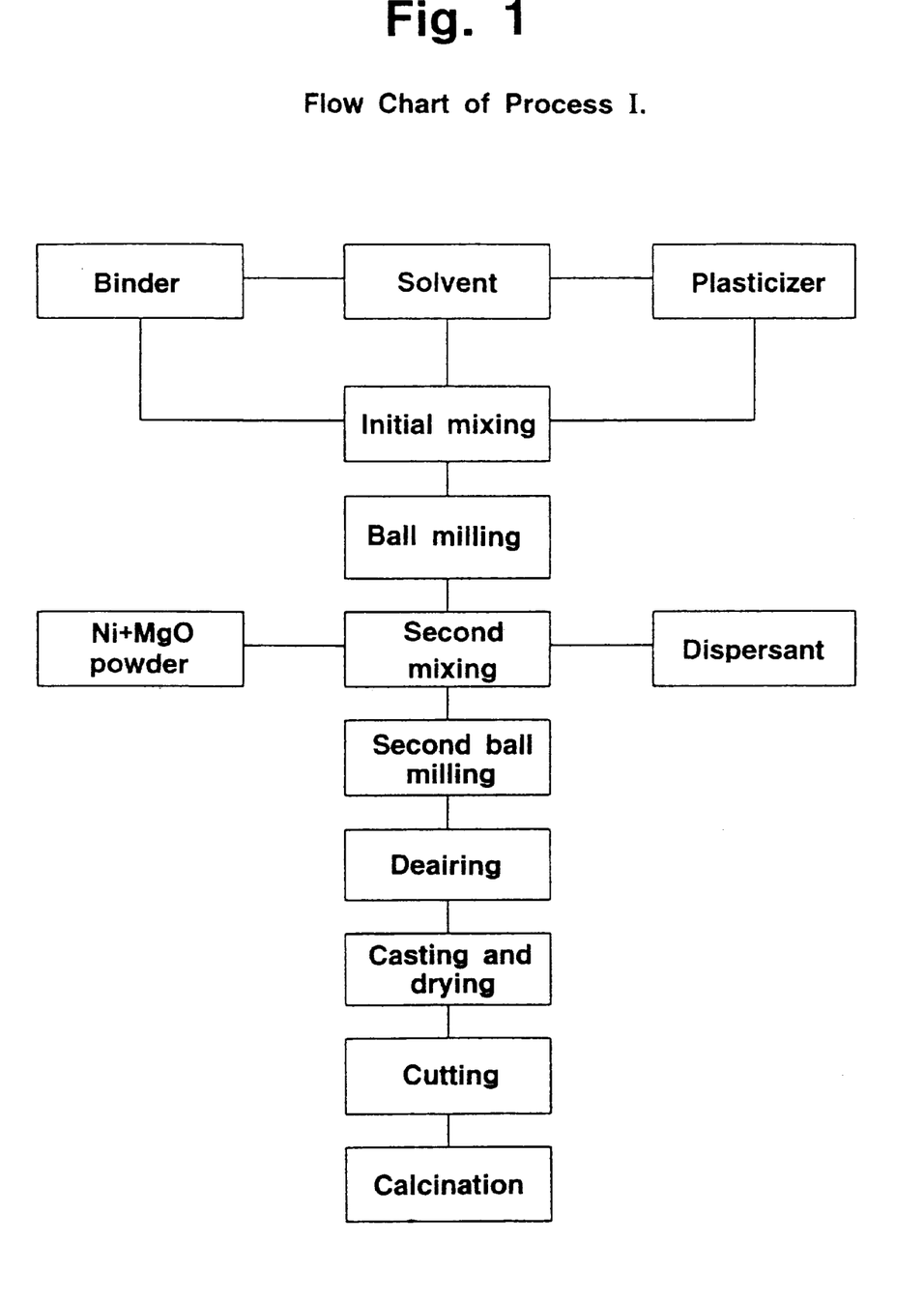
FIG. 1 is a flow chart representing a process for preparing a cathode for molten carbonate fuel cells according to the first mixing-second molding process of the present invention (process I).

Ni powder having the particle size of 3 to 7 $\mu$m is mixed with alkaline earth metal oxide powder at a desired mole ratio. The mixture is added to distilled water, and then binder, plasticizer, dispersant, defoamer, etc. are added to the solution to adjust the viscosity thereof. The resulting mixture is sufficiently mixed by ball milling, and then the mixture is molded as a thin plate having the thickness of 0.5 to 1.0 mm by the tape casting method. The dried green sheet is calcined at 700 to 1200°C. under hydrogen atmosphere to prepare a cathode (see FIG. 1).

Process II (First Molding-Second Impregnation Process)

Figure 2:
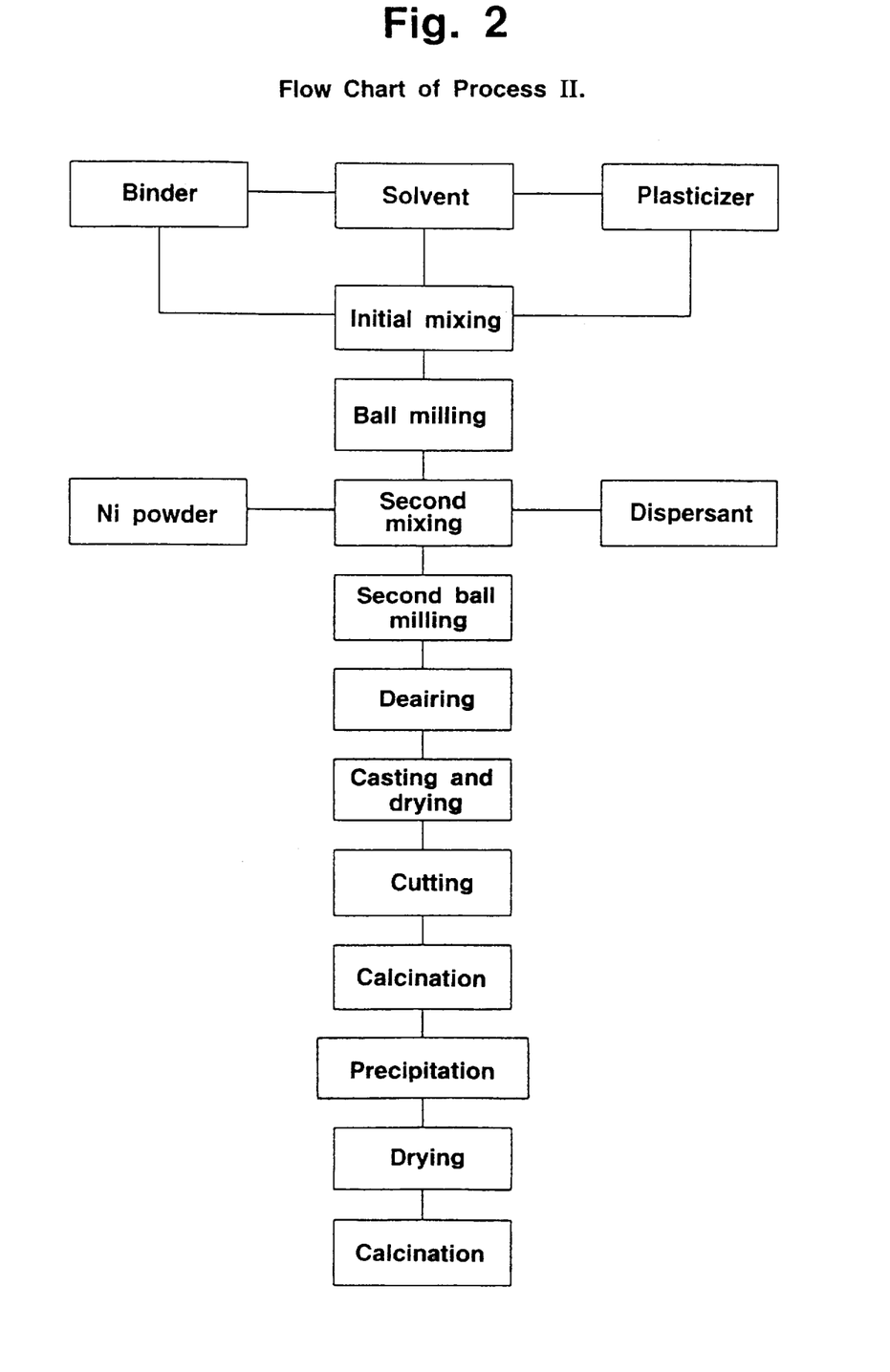
FIG. 2 is a flow chart representing a process for preparing a cathode for the molten carbonate fuel cells according to the first molding-second impregnation process of the present invention (process II).

Binder, plasticizer, dispersant, defoamer, etc. as well as distilled water are added to Ni powder having the particle size of 3 to 7 $\mu$m to prepare a slurry having a desired viscosity, which is then sufficiently mixed by ball milling. The slurry is molded as a thin plate having the thickness of 0.5 to 1.0 mm by the tape casting method. The dried green sheet is calcined at 700 to 1200° C. under the hydrogen atmosphere primarily to prepare a cathode. The prepared cathode is dipped into an aqueous alkaline earth metal nitrate solution and the solution is allowed to enter the pores of the cathode for a certain time. The cathode is removed from the solution and dried, and then is calcined at 500° C. under hydrogen atmosphere (see FIG. 2).

Nickel used in the present invention has preferably the particle size of 3 to 7 $\mu$m, and when a cathode is molded with the nickel, the cathodes prepared according to the processes I and II should have above 70% porosity and pore size of about 7 to 15 $\mu$m.

The alkaline earth metal oxides which can be used in the process I of the present invention include MgO, CaO, SrO, BaO, etc., in which the size of the particles thereof is properly similar to that of nickel but may be different from that of nickel to adjust the porosity of cathodes. The alkaline earth metal nitrates which can be used in the process II of the present invention may be $Mg(NO_3)_2 \cdot 6H_2O$, $Ca(NO_3)_2 \cdot 4H_2O$, $Sr(NO_3)_2$, $Ba(NO_3)_2$ and the like.

The binders which can be used to maintain the strength of the green sheet of the cathode being prepared in the present invention include methyl cellulose, polyvinyl alcohol, acrylic polymer, etc. It is preferred that the amount of the binder added is 2% to 3% by weight of Ni powder used.

In the present invention, the plasticizers which can be used to increase the flexibility when tape casting and processibility of the dried green sheet include glycerine, triethylene glycol and so on. It is preferred that the amount of the plasticizer added is 1% to 3% by weight of Ni powder used.

The dispersants which can be used to enhance the dispersibility of Ni particles when preparing a slurry in the present invention may be surfactants. It is preferred that the amount of the dispersants added is 1% to 3% by weight of Ni powder used.

The defoamers which can be added to suppress the occurrence of pin holes in green sheet by removing bubbles occurred when preparing a slurry in the present invention may be mineral oils and polysiloxene defoamers. It is preferred that the amount of the defoamers added is 0.5% to 1.0% by weight of Ni powder used.

Hereinafter, the present invention will be more specifically described by the following examples but the scope of the present invention is not limited in any way to the examples.

EXAMPLE 1

Figure 3:
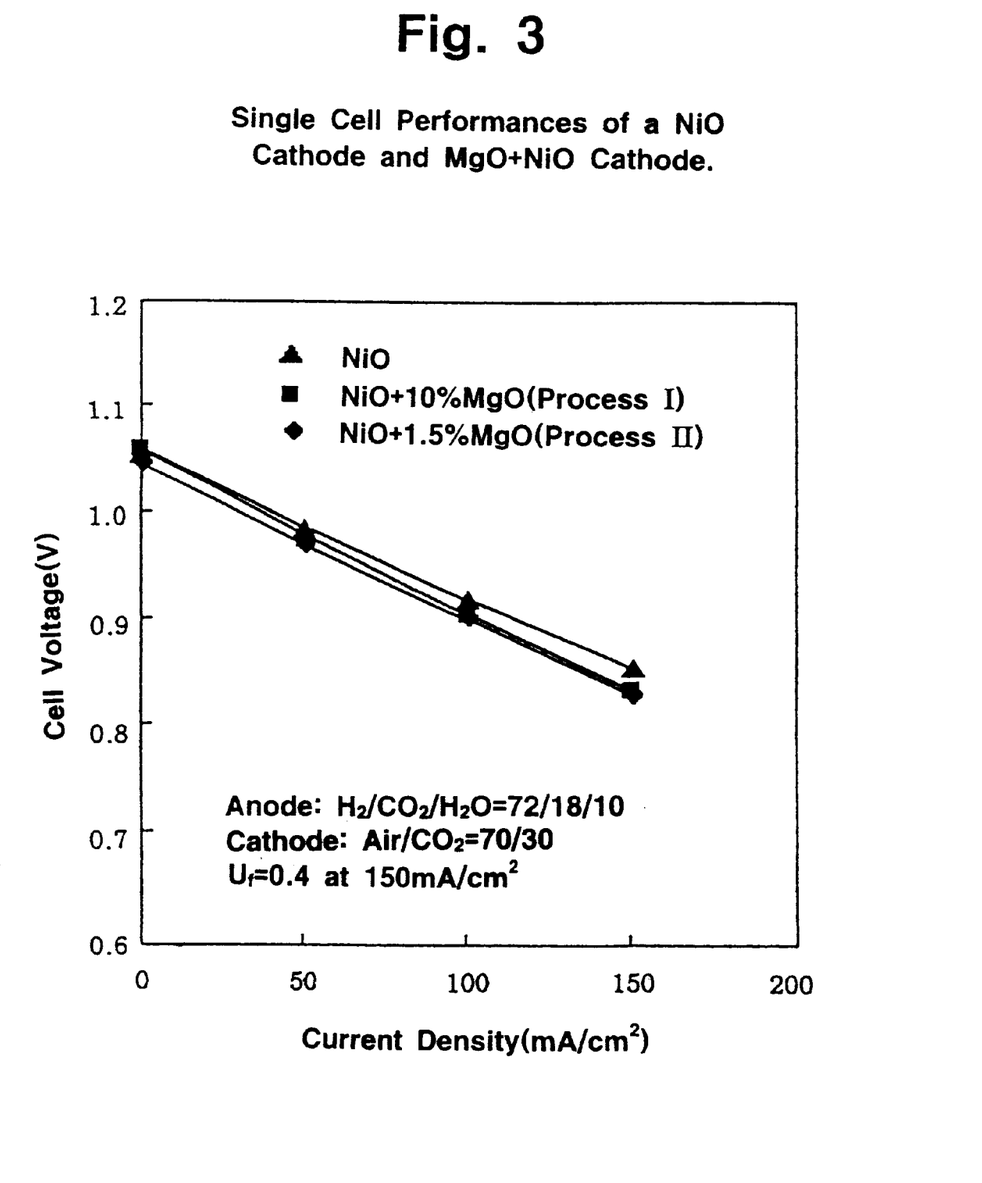
FIG. 3 is a graph comparing the performance of single cells of the common NiO cathode and that of NiO+MgO cathodes prepared according to the processes of the present invention.

125 g of distilled water, 2.5 g of methyl cellulose as a binder, 2 g of glycerine as a plasticizer and 1 g of SN-DEFOAMER-154 (Registered trademark) polypropylene ethyl ether as a defoamer were mixed and then ball milled for 24 hours. After ball milling was completed, 100 g of a mixture prepared by mixing INCO255 (registered trademark) nickel powder and powder of MgO, which is an alkaline earth metal oxide at a 9:1 mole ratio, and 2 g of DARVAN-C (Registered trademark) ammonium polyacrylate salt solution as a dispersant were added to the previously ball-milled mixture which was again ball milled for 4 hours. The prepared slurry was tape casted to mold a thin plate of 0.7 mm thickness, which was allowed to air dry. The prepared green sheet was calcined at 1000° C. under reducing atmosphere (10% hydrogen, 90% nitrogen) to prepare a cathode. A single cell having the cathode area of 25 cm² was equipped with the prepared cathode and then was continuously operated under the load of 150 mA/cm² for 500 hours. The composition and the operating conditions of the cell are represented in Table 1. The performance of single cells with the common NiO cathode was compared with that of the present example at the same operating conditions and the result is illustrated in FIG. 3. FIG. 3 shows that the performance of single cells of the present example is almost similar to that of the common NiO cathode and the cathode prepared according to the present invention has a good electrochemical performance.

The cell was disassembled after the operation thereof was completed and the amount of Ni deposited in the matrix thereof was analyzed with an atomic absorption spectroscope to obtain the result described in Table 2.

TABLE 1

Composition and operating conditions of single cells

| | |
|---|---|
| Anode | Ni + 10% Cr |
| Matrix | LiAlO₂ |
| Cathode | NiO + 10% MgO |
| Electrolyte | 62Li₂CO₃ + 38K₂CO₃ |
| Fuel | 72% H₂/18% H₂/10% H₂O (Utilization = 40%) |
| Oxidant | 70% Air/30% CO₂ |
| Temperature | 650° C. |

TABLE 2

Amount of Ni deposited in matrix after 500 hours of operation

| | NiO Cathode (Conventional Art) | Example |
|---|---|---|
| Ni Amount In The Matrix (Wt %) | 2.0 | 0.5 |

Figure 4:
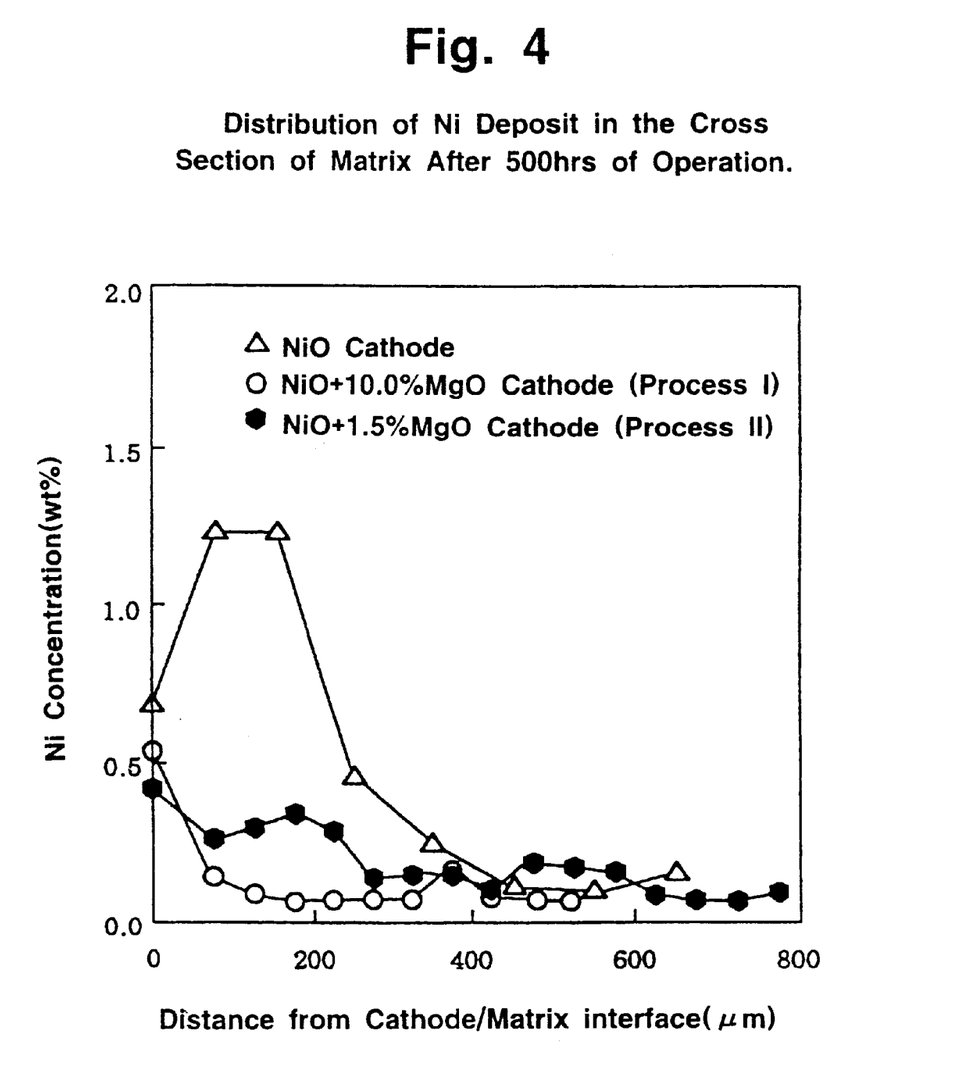
FIG. 4 is a graph comparing the amounts of Ni deposited on the cross section of the matrix of the common NiO cathode after 500 hours of operation and that of NiO+MgO cathodes prepared according to the processes of the present invention.
Figure 5A:
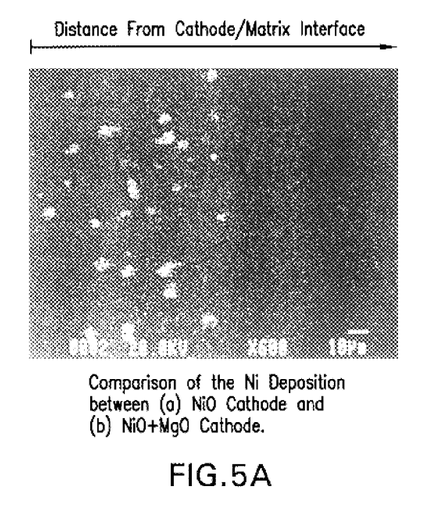
FIG. 5a is a photograph of scanning electron microscope representing the Ni deposition on the cross section of the matrix of the common NiO cathode.
Figure 5B:
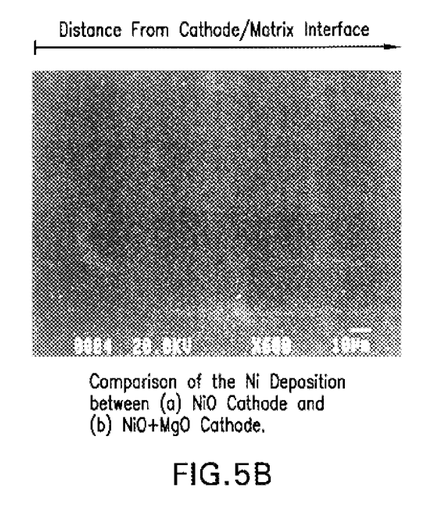
FIG. 5b is a photograph of scanning electron microscope representing the Ni deposition on the cross section of the matrix of the NiO+MgO cathode prepared in accordance with the processes of the present invention.

Table 2 shows that when using a cathode prepared according to the process I of the present invention, the amount of Ni deposited in the matrix thereof was markedly reduced to ¼ of that when using the common NiO cathode. The amount of Ni distributed in the cross section of the same matrix was analyzed by using an EPMA (electron probe micro analyzer) to obtain the result illustrated in FIG. 4. As shown in FIG. 4, the amount of Ni deposited over the cross section of the matrix when using a cathode according to the present invention was markedly reduced compared to the comparative example. After the operation of the cells was completed, the distributions of Ni deposited in the cross sections of the matrixes were analyzed by using an EPMA to obtain the result illustrated in FIG. 5. FIG. 5 shows that when using the cathode prepared according to the present invention, very little Ni was deposited in the matrix thereof, whereas when using the common cathode Ni particles having the particle size of 5 to 10 $\mu$m were deposited in the matrix thereof. It is known from such a result that the dissolution of a cathode can be markedly reduced by using the cathode prepared according to the present invention.

EXAMPLE 2

125 g of distilled water, 2.5 g of methyl cellulose of a binder, 2 g of glycerine as a plasticizer and 1 g of SN-DEFOAMER-154 (Registered trademark) polypropylene ethyl ether as a defoamer were mixed and then ball milled for 24 hours. After ball milling was completed, 100 g of INCO255 (registered trademark) nickel powder and 2 g of DARVAN-C (Registered trademark) ammonium polyacrylate salt solution as a dispersant were added to the previously ball-milled mixture which was again ball milled for 4 hours. The prepared slurry was tape casted to mold a thin plate of 0.7 mm thickness. The prepared green sheet was calcined at 800° C. under hydrogen atmosphere preliminarily to prepare a cathode. The cathode thus prepared was dipped in an aqueous Mg(NO₃)₂.6H₂O solution for 24 hours to allow the solution to sufficiently enter the pores of the cathode. The cathode was removed from the solution and dried, and then was calcined at 500° C. under hydrogen atmosphere for 2 hours to finally prepare the cathode. A single cell having the size of 25 cm² was equipped with the cathode and then continuously operated under the load of 150 mA/cm² for 500 hours under the same operating conditions as in example 1. As illustrated in FIG. 3, the voltage of the cell of the present example is 0.83 volts under the load of 150 mA/cm². Such result shows that the performance of the cell prepared by using the cathode prepared is similar to that of the cell prepared with the common NiO cathode or by means of the first mixing-second molding process of example 1. Also, the amount of Ni deposited was measured after operation of the cell was completed. The precipitated amount of Ni prepared by using the cathode of the present example was much lower than the 2.0% by weight measured for the common NiO cathode and was similar to that of example 1. Further, the distribution of Ni deposited in the matrix was also measured with an EPMA to obtain the result illustrated in FIG. 4. As illustrated in FIG. 4, it is known that the Ni concentration of the cell prepared with the cathode of the present example was much lower than that of the cell prepared when using the common cathode at the same position and was similar to that of the cell prepared according to example 1.

EXAMPLE 3

The cathode was prepared using the same substances and process as in example 2. A single cell of the size of 25 cm$^2$ was equipped with the cathode and then was continuously operated under the same operating conditions of the cell in example 1 for 2000 hours. After operation was completed, the amount of Ni deposited was measured as 1.9% by weight when using the cathode according to the present invention whereas it was measured as 4.9% by weight when using the common cathode. Accordingly, it was confirmed that the amount of Ni deposited was markedly reduced when using the cathode according to the present invention compared to when using the common cathode, and the addition sustained its effect even though the operation time of the cell was longer.

What is claimed is:

1. A method for preparing a cathode for molten carbonate fuel cells comprising the steps of preparing a slurry from Ni powder, molding the slurry as a thin plate having the thickness of 0.5 to 1.0 mm by tape casting, drying the thin plate to obtain a green sheet, calcinating the green sheet at 700 to 1200° C. under hydrogen atmosphere to prepare a calcined cathode, dipping the calcined cathode into an aqueous alkaline earth metal nitrate solution, air drying the impregnated cathode, and then calcinating the dried cathode at 500° C. under hydrogen atmosphere.

2. The method according to claim 1, wherein said alkaline earth metal nitrate is selected from the group consisting of $Mg(NO_3)_2 \cdot 6H_2O$, $Ca(NO_3)_2 \cdot 4H_2O$, $Sr(NO_3)_2$ and $Ba(NO_3)_2$.

* * * * *